United States Patent

[11] 3,554,221

| [72] | Inventors | Everett D. McMurry;<br>Bolling A. Abercrombie, Houston, Tex. |
|---|---|---|
| [21] | Appl. No. | 794,189 |
| [22] | Filed | Jan. 27, 1969 |
| [45] | Patented | Jan. 12, 1971 |
| [73] | Assignee | McMurry Oil Tools, Inc.<br>Houston, Tex.<br>a corporation of Texas |

[54] METHOD AND APPARATUS FOR STABILIZING FLUID FLOW
7 Claims, 4 Drawing Figs.

[52] U.S. Cl...................................................... 137/501,
137/613
[51] Int. Cl........................................................ G05d 7/01
[50] Field of Search............................................ 137/8,
505.13, 500, 501, 553, 613

[56] References Cited
UNITED STATES PATENTS
562,131   6/1896   Gordon ...................... 137/501

| 840,831 | 1/1907 | Doorenbos .................. | 137/501 |
| 1,538,427 | 5/1925 | Earl ............................. | 137/8 |
| 1,684,835 | 9/1928 | Larsen ......................... | 137/553X |
| 2,087,037 | 7/1937 | McCarthy ..................... | 137/505.13X |

Primary Examiner—M. Cary Nelson
Assistant Examiner—Rothman R. B.
Attorney—Arnold, Roylance, Kruger & Durkee ABSTRACT: Methods and apparatus are provided for stabilizing the flow rate of fluid independently of variations in upstream or downstream pressure. A controller is provided which incorporates a selectively adjustable throttling valve, and a control valve responsive to variations in upstream pressure. A chamber is provided between the two valves to contain the fluid at a pressure intermediate of upstream and downstream pressures, and a loading mass is connected to the control valve to maintain a fixed differential in the chamber between the intermediate and the upstream pressure.

Everett D. McMurry &
Bolling A. Abercrombie
INVENTORS

BY Arnold, Roylance,
Kruger & Durkee
ATTORNEYS

Everett D. McMurry &
Bolling A. Abercrombie
INVENTORS

BY Arnold, Roylance,
Kruger & Durkee
ATTORNEYS 3,554,221

METHOD AND APPARATUS FOR STABILIZING FLUID FLOW

BACKGROUND OF INVENTION

This invention relates to methods and apparatus for establishing and maintaining a preselected stable fluid flow rate, and more particularly relates to methods and apparatus for establishing and maintaining a stable gas input rate in a gas-lift system. Specifically, an improved apparatus is disclosed for providing a relatively constant preselected gas flow rate where upstream and downstream pressures are subject to wide fluctuations in magnitude.

It is well known to inject a high-pressure flow of gas into an oil well, whereby the gas expands in response of a decrease in pressure to lift the oil to the surface. It is also well known in the oil and gas industry that it is difficult to maintain stable pressures during gas-lift operation, both in the gas injection line and in the well. Thus, the flow rate of the injected gas is subject to sharp fluctuations, which may be due to one or more different unrelated factors or conditions, and these factors or conditions may be downhole as well as upstream at the gas supply source. In any event, this fluctuation tends to effect undesirable fluctuations in the production rate of the oil.

Many techniques have been tried for the purpose of stabilizing the injection rate of the input gas. None have achieved widespread acceptance, however, since their cost is usually extremely high, and since they are usually designed to cure only one of the various factors which tend to create such pressure fluctuations. Consequently, a simple fixed orifice is often relied upon to provide a stabilized flow rate.

These disadvantages of the prior art are overcome with the present invention, and novel methods and apparatus are provided for establishing and maintaining a preselected stable gas flow rate which is substantially independent of fluctuations of the pressures in either the gas supply or the borehole. Although the methods and apparatus of the invention are particularly suited to gas-lift operations in oil production, they are equally suited to any other purpose wherein a relatively stable preselected fluid flow rate is sought to be established and maintained.

SUMMARY OF INVENTION

As will hereinafter be explained in detail, a preferred embodiment of the invention involves the establishment of a pressure zone intermediate of the upstream and downstream pressures in a gas line or conduit which is interconnected between the injection gas supply and the well, and further involves maintaining the pressure in such intermediate zone at a fixed preselected differential relative to the so-called upstream pressure. In particular, means are provided for raising aNd lowering such intermediate pressure in response to any fluctuations in upstream pressure.

In particular, a chamber is provided having an input port communicating with the upstream pressure and an output port in communication with downstream pressure. A choke, preferably adjustable, is included for opening and closing the input port to establish a pressure drop there across, and a pressure-responsive closing means is provided which is actuated or positioned by the upstream pressure and which opens or closes the output port. A preselected weight is supported by the closing means to establish the preselected pressure differential between the upstream pressure and the intermediate pressure, whereby the flow rate of the gas through the chamber is completely independent of either the upstream pressure or the downstream pressure.

It will be clearly apparent to those with skill in this art that there are factors in the determination in fluid flow rate other than the upstream and downstream pressures of the fluid flow, and that the present invention is not primarily directed to any of these other factors. However, the upstream and downstream pressures are obviously the most important factors governing the flow rate of a fluid, and thus the present invention will effectively maintain a preselected flow rate within limits which are useful for most practical purposes.

These and other advantages and features of the present invention will be apparent from the following detailed description, wherein reference is made to the figures in the accompanying drawings.

DRAWINGS

DETAILED DESCRIPTION

Figure 1:
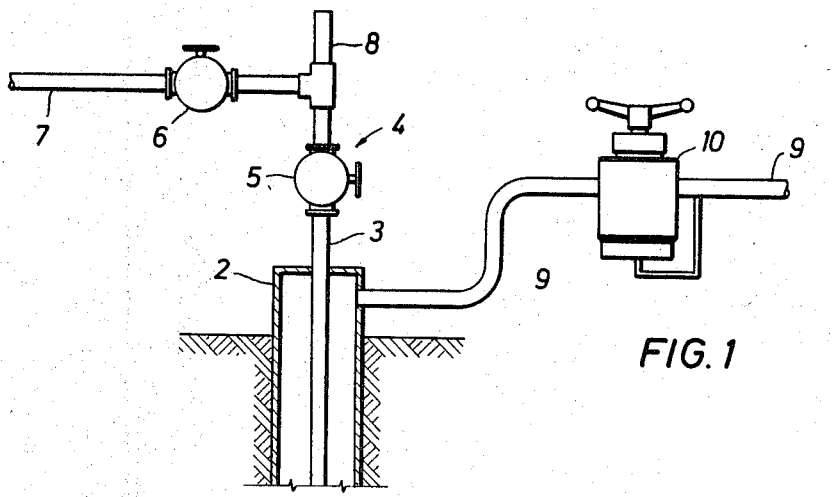
FIG. 1 is a functional representation of the wellhead portion of a typical oil well interconnected to receive injection gas for gas-lift purposes, including a generalized pictorial representation of suitable flow rate stabilization means embodying the concept of the present invention.

Referring now to FIG. 1, there may be seen a functional representation of the wellhead portion of a typical oil well interconnected to receive injection gas for gas lift purposes, including one or more gate valves 5 and 6 with connecting conduits 7 and 8 for delivering liquids and gases to different locations. The well may include a well casing 2 and tubing 3 arranged in a conventional manner to receive oil from a subsurface earth formation (not depicted). Injection gas may be received under pressure from a conventional gas pipe line 9 which is connected to deliver the gas into the annular space between the tubing 3 and the casing 2.

As hereinbefore stated, it is desirable to control the flow rate of the gas being injected into the casing 2. Accordingly, there may be provided a suitable flow rate control assembly 10 interconnected in the pipe line 9 between the casing 2 and the supply source of the injection gas (not depicted). As will hereinafter be explained in detail, the assembly 10 operates to establish and maintain a relatively stable flow rate independent of fluctuations of the gas pressure either upstream or downstream of the assembly 10.

Figure 2:
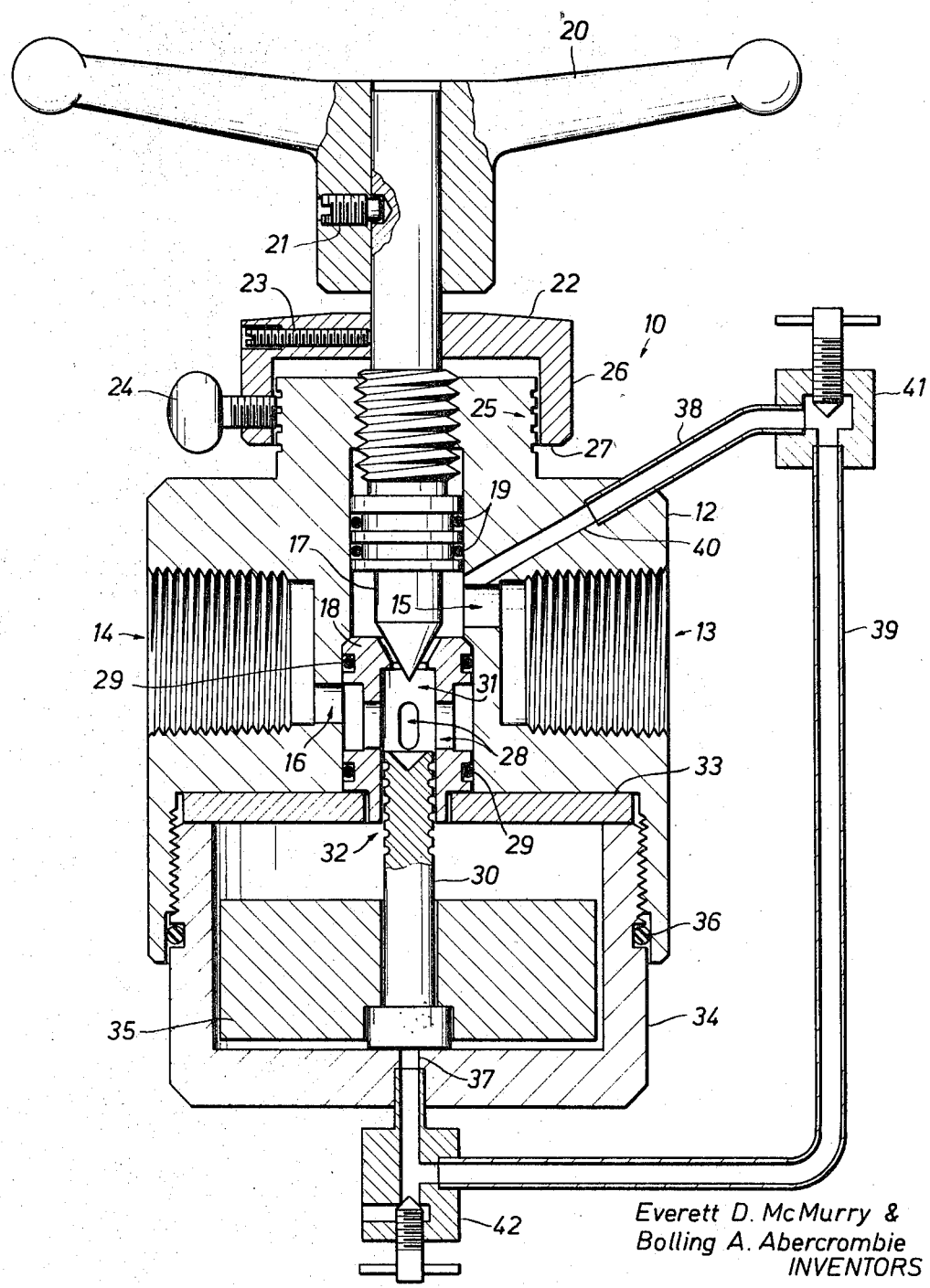
FIG. 2 is a pictorial representation, partly in cross section, of the basic operating parts of a suitable form of flow rate control apparatus embodying the concept of the present invention.

Referring now to FIG. 2, there may be seen a more detailed representation, partly in cross section, of the flow rate control assembly 10 generally depicted in FIG. 1. In particular, there is depicted a hollow body 12 having an inlet port 13 suitably threaded for interconnection with the upstream end of a portion of the gas injection line 9, and a similarly threaded outlet port 14. A cylindrical valve seat body 18, having an intake port located in its upper end, and having four longitudinal outlet ports or slots 28 equidistantly located around its circumference may be located intermediate of ports 13 and 14. A pair of O-ring gaskets 29 may be provided, whereby fluid entering the body 12 by way of the inlet port 13 and the connecting inlet passageway 15, will flow down into the valve seat body 18 only by way of the intake port located in its upper end, and will exit through the outlet port 14 only by way of the slots 28 and the connecting annular cavity and outlet passageway 16.

Fluid flow through the body 2 and the valve seat body 18 may be selectively restricted or interrupted by a suitable valve stem 17 having a conical end portion adapted for shutoff engagement with the intake port of the valve seat body 18. The stem 17 may be threadedly inserted in the upper end of the body 2 and a conventional handle 20 may be provided for turning the valve stem 17 to move its conical end in or out of engagement with the valve seat body 18. In addition, one or more O-ring gaskets 19 may be provided as shown, for the purpose of preventing fluid flow upward along the stem 17 and out of the body 2.

As will hereinafter be apparent, it is desirable that the valve stem 17 be selectively positioned with respect to the intake port of the valve seat body 18. Accordingly, an indicator flange 22 having an indicator lip 26 may be concentrically and slidably mounted on the valve stem 17, and a suitable setscrew 23 may be included for the purpose of fixedly positioning the lower edge 27 of the lip 26 with respect to a plurality of spaced-apart indicator grooves 25 located about the narrowed neck portion of the body 2. The grooves 25 are preferably spaced apart a preselected distance such that one complete revolution of the stem 17 will move the edge 27 of the lip 26 from one groove 25 to another.

The body 12 may further be seen to be provided with a body plug 34 having a threaded portion and an O-ring 36 for gastight engagement therewith. A pressure input port 37 may be seen to be centrally located in the lower portion of the body plug 34, and a bleedoff valve 42 may be interconnected in this port 37. The valve seat body 18 may be supported on a plate 33 which, in turn, is supported on the upper edge of the body plug 34.

As may be seen in FIG. 2, there may be provided a metering plunger 30 located to move slidably in and out of the lower end of the valve seat body 18, for the purpose of restricting or interrupting gas flow through the slots 28. A loading mass 35 of a preselected weight is preferably arranged to be supported by the lower end of the metering plunger 30, and a plurality of grooves 32 may be provided about the upper end of the plunger 30 to function as a labrinthine gas seal between the plunger 30 and the adjacent surfaces of the valve seat body 18.

A suitable pressure line 38 may be connected at one end to a pressure outlet port 40 communicating with the inlet passageway 15, and at its other end with the inlet side of a shutoff cock or valve 41. Another pressure line 39 may be interconnected at one end with the outlet side of the shutoff valve 41, and at its other end with the intake side of the bleedoff valve 42 disposed in the body plug 34.

It will be clearly apparent that there is a direct path of communication between the interior of the body plug 34 and the inlet port 13, by way of lines 38 and 39 and valves 41 and 42. Accordingly, the pressure in the body plug 34 will be the same as the upstream pressure in the inlet port 13 (disregarding the effect of any gas seepage along the surface of the metering plunger 30). Thus, the upstream pressure in the body plug 34 will tend to drive the metering plunger 30 upwards into the valve seat body 18 to close off the slots 28.

On the other hand, the combined weight of the loading mass 35 and the metering plunger 30 tends to oppose such upward movement of the plunger 30, and to keep the slots 28 more or less uncovered. Accordingly, there will be a pressure drop across the intake portion of the valve seat body 18 which is directly proportional to the weight of the loading mass 35, and there will be a further pressure drop across the slots 28 which is dependent upon the pressure in the region of the outlet port 14 downstream of the slots 28.

The injection gas flow rate which is sought to be established and maintained, may be selected by rotating the stem 17 into a preselected spacing with respect to the intake port in the top end of the valve seat body 18, and this spacing can be determined by locating the edge 27 of the indicator lip 26 adjacent the appropriate one of the indicator grooves 25. The so-called "intermediate" pressure within the valve seat body 18 will still fluctuate as the upstream pressure fluctuates. Nevertheless, the pressure differential between the upstream and the intermediate pressures will be substantially equal to the sum of the weights of the loading mass 35 and the metering plunger 30 divided by the cross-sectional area of the metering plunger 30. These quantities are predeterminable and constant, and thus the pressure differential between the intermediate and upstream pressures will be a constant predetermined quantity which is independent of the magnitude of the upstream pressure or the downstream pressure.

The basic object of the equipment depicted in FIG. 2, is to provide means to select and maintain a preselected pressure differential between the upstream and intermediate pressures, which will remain constant irrespective of any variations in either the upstream or downstream pressures. There are flow control devices, in the prior art, utilizing a spring for the purpose of establishing such a pressure differential. In equipment utilizing a loading spring, however, the pressure differential tends to vary with the spring rate whenever variations in either the upstream pressure or the downstream pressure produce changes in the orificing capacity (size) between the intermediate and downstream pressures. When a loading mass or weight is used for establishing the pressure differential, as in the case of the present invention, the pressure differential is the sum of the weight of the loading mass 35 and the metering plunger 30, as divided by the cross-sectional area of the metering plunger 30. It should be clearly apparent that this weight and area does not vary with changes in upstream or downstream pressure, and thus the pressure differential between the intermediate pressure within the valve seat body 18 and the upstream pressure in the inlet passage 15, will always be constant irrespective of any variations which may occur in either the upstream or downstream pressures.

It should also be recognized, as hereinbefore stated, that there are factors governing the flow rate of gas under a pressure, other than the pressure differential between the intermediate and upstream pressures. However, the pressures upstream and downstream of the assembly 10 are the most important factors in determining the flow rate of the gas. Thus the present invention may be clearly seen to operate to stabilize the flow rate to a substantial degree at the preselected value sought to be maintained, as will hereinafter be demonstrated.

Figure 3:
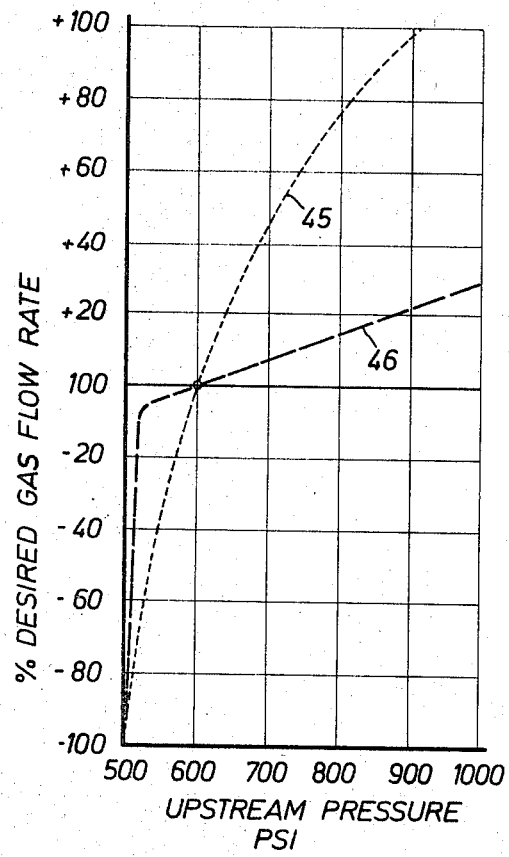
FIG. 3 is a graphic representation of the flow rate of a fluid as a function of upstream pressure, and illustrating a comparison of such rate with and without control by the methods and apparatus of the present invention.

Referring now to FIG. 3, there may be seen a graphic representation of the rate of change in the flow rate of a gas, when the injection rate is stabilized by means of apparatus such as that depicted in FIG. 2, in comparison to the change in flow rate of gas flow through a fixed orifice in the flow line, wherein the downstream pressure is constant. In particular, the dotted line 45 represents the actual flow rate change occurring as a result of changes in upstream pressure, when the flow is controlled by the orifice, and the dashed line 46 represents the change in flow rate occurring during fluctuations in upstream pressure when the flow rate is controlled by apparatus of the type depicted in FIG. 2. Thus, it may be seen that if the fixed orifice provides the desired flow rate when the downstream pressure is 500 p.s.i. and the upstream pressure is 600 p.s.i., an increase in upstream pressure to 700 p.s.i. will produce a 42 percent increase in the gas flow rate into the casing 2 depicted in FIG. 1. On the other hand, when the flow rate is controlled by a device such as the assembly 10, an increase in upstream pressure from 600 to 700 p.s.i. will produce only an 8 percent increase in the flow rate, at a downstream pressure of 500 p.s.i.

Figure 4:
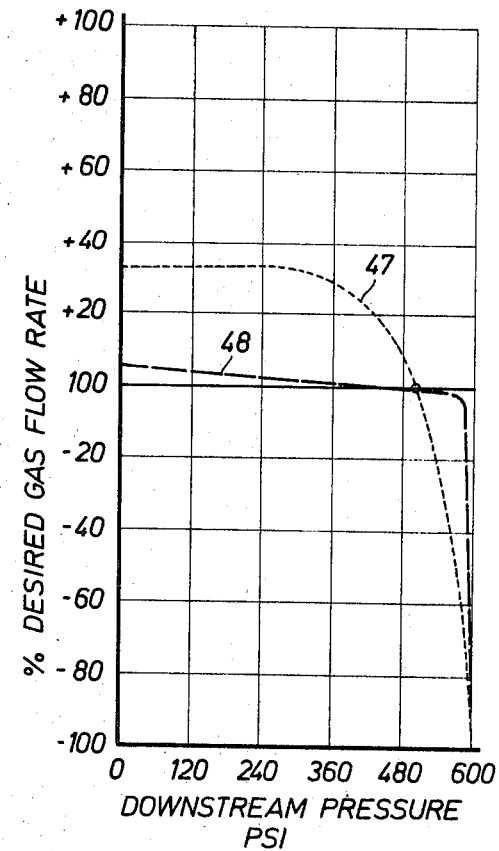
FIG. 4 is a graphic representation similar to that depicted in FIG. 3, but illustrating a comparison of changes in flow rate as a function of the downstream pressure of the fluid.

Referring now to FIG. 4, there may be seen a graphic representation of flow rate change in response to changes in downstream pressure, for gas flow being controlled by a fixed orifice, in contrast to changes in the flow rate of gas being controlled by equipment of the type depicted in FIG. 2. More particularly, the dotted line 47 indicates the flow rate of gas under control of a fixed orifice, and dashed line 48 shows the flow rate of gas being controlled by equipment embodying the concept of the present invention. Thus, if it be assumed that the proper flow rate may be achieved at a constant 600 p.s.i. upstream pressure and a 500 p.s.i. downstream pressure, a decrease in downstream pressure to 360 p.s.i. will produce a 30 percent increase in the flow rate of gas passing through a fixed orifice, the upstream pressure remaining constant at 600 p.s.i. On the other hand, the flow rate of gas being controlled by apparatus such as that depicted in FIG. 2, will change less than 1 percent under similar conditions.

It will be seen that the loading mass 35 is preferably only slidably disposed about the metering plunger 30. Thus, the body plug 34 may be conveniently removed from the body 12, and the loading mass 35 may be easily removed and replaced by a similar component of a different known weight, if it is necessary or desirable to change the pressure differential between the upstream pressure and the intermediate pressure within the valve seat body 18.

The labrinthine gas seal provided by the grooves 32 is particularly suitable for purposes of the present invention, since slidable movement of the metering plunger 30 is not restricted. In an alternative embodiment of the present invention, a conventional O-ring gasket or the like may be utilized to provide a positive gas seal to substantially eliminate all gas seepage into the intermediate pressure chamber 31. In such a case, however, the pressure differential between the upstream and intermediate pressures will be equal to the fraction, wherein the numerator is the sum of the weights of the loading mass 35 and the metering plunger 30, and wherein the denominator is the cross-sectional area of the cylindrical aperture in the valve seat body 18 containing the metering plunger 30.

It will be apparent from the foregoing that various modifications and variations may be made in the structures and procedures described herein without substantial departure from the essential concept of the present invention. Accordingly, it should be clearly understood that the forms of the invention described herein and depicted in the accompanying drawings, are exemplary only and are not intended as limitations on the scope of the present invention.

We claim:

1. Flow control apparatus for selectively establishing and stabilizing fluid flow at substantially a preselected flow rate, said apparatus comprising:
    a hollow body member adapted to be interconnected across the flow path of said fluid flow sought to be stabilized and having spaced-apart inlet and exit ports for receiving and discharging said fluid;
    a valve seat body means centrally located in said body member to establish an upstream pressure region between said valve seat body means and said inlet port and a downstream pressure region between said valve seat body means and said exit port;
    said valve seat body being hollow to establish an intermediate pressure region and further having an intake port communicating with said upstream region to establish a pressure differential between said intermediate and upstream regions and an outlet port communicating with said downstream region to establish a pressure differential between said intermediate and downstream regions;
    throttling means engageable with said valve seat body for establishing fluid flow through said intake port at a preselected flow rate;
    control valve means responsive to the pressure in said upstream pressure region for selectively engaging said valve seat body and maintaining the pressure in said intermediate pressure region as a function of said pressure in said upstream pressure region; and
    loading means interconnected with said control valve means in opposition to said pressure in said upstream pressure region for establishing and maintaining a preselected differential between said intermediate and upstream pressure regions.

2. The flow control apparatus described in claim 1, wherein said loading means is a weight of a fixed preselected magnitude functionally related to the preselected differential sought to be maintained between said intermediate and upstream pressure regions.

3. The apparatus described in claim 1, wherein said throttling means includes a valve stem member movably interconnected with said body member for selective throttling engagement with said intake port in said valve seat body means to establish a preselected rate of fluid flow from said upstream pressure region into said intermediate pressure region.

4. The apparatus described in claim 3, wherein said apparatus further comprises:
    a body plug means gas tightly connected to said hollow body member and defining and establishing a secondary pressure region substantially separate from said upstream and downstream pressure regions and said intermediate pressure region;
    wherein said pressuring means includes conduit means interconnected between said upstream pressure region and secondary pressure region to substantially equalize the pressure therebetween; and
    wherein said control valve means is responsive to the pressure in said secondary pressure region.

5. The apparatus described in claim 4, wherein said valve seat body means includes a further aperture separate from said intake and outlet ports therein for communication between said secondary pressure region defined by said body plug means and said upstream pressure region, and wherein said control valve comprises a metering piston-like plunger slidably and generally fluid-tightly disposed in said further aperture with one end located in said secondary pressure region and with the other end thereof extending into said intermediate pressure region for blocking engagement with said outlet port in said valve seat body means.

6. The apparatus described in claim 5, wherein said weight is disposed in said secondary pressure region and supported on said one end of said metering plunger, and wherein said pressure differential between said intermediate and upstream pressures is functionally related to the sum of the weights of said loading mass and said metering plunger divided by the cross-sectional area of said further aperture in said valve seat body means.

7. The apparatus described in claim 6, further including indicator means interconnected with said hollow body member and said valve stem member to provide a functional indication of the flow rate of fluid flow through said intake port in said valve seat body.